United States Patent Office 3,655,887
Patented Apr. 11, 1972

3,655,887
COMPOSITIONS FOR TREATMENT OF TOXOPLASMOSIS AND COCCIDIOSIS
Yasuto Takamatsu, Toshio Ishii, Toshio Hayami, and Yoshiharu Tsubota, Tokyo, Japan, assignors to Takeda Chemical Industries, Ltd., Osaka, Japan
No Drawing. Filed May 5, 1969, Ser. No. 821,989
Claims priority, application Japan, May 6, 1969, 44/30,170
Int. Cl. A61k 27/00
U.S. Cl. 424—229
16 Claims

ABSTRACT OF THE DISCLOSURE

The present invention relates to a method for the prevention or treatment of protozoal infections such as coccidiosis or toxoplasmosis by the use of 3-sulfanilamido-isoxazole and pharmaceutically acceptable salts thereof, preferably in a novel combination with certain anti-coccidial pyrimidine derivative salts.

---

This invention relates to a method for the prevention or treatment of protozoiasis in animals, and also to a composition administrable to animals therefor.

The protozoiasis, caused by protozoal infections in livestock and poultry, such as coccidiosis, leucocytozoon infections, toxoplasmosis, piroplasmosis, etc., not only lower the productive performance of the afflicted animals but sometimes kill them in large numbers.

Of those protozoan infections, coccidiosis is the most important, and while the use of some pyrimidine derivatives has proved fairly successful in the prevention and treatment of coccidiosis, the effects attainable still leave something to be desired. Stated differently, there are two types of coccidiosis: One is an acute disease accompanied by hemorrhagic lesions caused by such coccidia as *Eimeria tenella* and *Eimeria necatrix*, and the other is a chronic disease caused by such other coccidia as *Eimeria acervulina*, *E. maxima* and *E. brunetti*. Under field conditions the hosts are often infected with both types of the pathogenic organisms and such mixed infections frequently produce far more serious afflictions than do infections with a single species of the causative organisms.

While the aforementioned pyrimidine derivatives are fairly effective, though selectively, against acute coccidiosis, offering substantial symptomatic relief, they have no appreciable effects upon chronic coccidiosis.

Though outbreaks of chronic coccidiosis generally result in less serious damage than acute cases, the ravages played by the former in meat-producing livestock and poultry such as broilers have been matters of great concern because the disease lowers their feed intake and accordingly make them more vulnerable to other diseases.

While several sulfa drugs have been used for this purpose, there is none that has proved completely effective. Moreover, many a protozoan infection is actually caused by several species of protozoa and, therefore, a drug that will control a variety of infections has been awaited.

Under the circumstances the present inventors found that 3-sulfanilamidoisoxazole (hereinafter may be referred to as "3-SI") has excellent prophylactic and therapeutic effects upon protozoiasis in animals, particularly upon chronic coccidiosis, and further found that this 3-SI and a salt of pyrimidine derivatives of the general Formula I, if used in conjunction, join forces to act effectively against all cases of coccidiosis, both acute and chronic, in poultry:

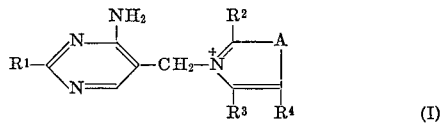

(I)

wherein A represents —S— or —CH=CH—, $R^1$ represents lower alkyl of at most 3 carbon atoms, and each of $R^2$, $R^3$ and $R^4$ represents H or lower alkyl of at most 3 carbon atoms. The present invention is an outgrowth of the above findings.

The principal object of the present invention is, therefore, to provide an anti-protozoal composition which is not only effective and non-toxic, but also stable and palatable to the livestock or poultry.

Another object of this invention is to provide a method for controlling (i.e. preventing or treating) protozoan infections in livestock or poultry more effectively and with ease as compared with hitherto-known methods.

Said objects are realized by the use of 3-SI or the combined use of 3-SI and a salt of pyrimidine derivatives of the general Formula I as the active ingredient or ingredients in the anti-protozoal composition to be administered to livestock, e.g. swine, dairy cattle, beef cattle, calf, lamb, horse, kid and dog, and to poultry, e.g. chick, layer, breeder, duck, turkey and quail.

3-SI can be prepared, for example, by the method described in British Pat. No. 1,011,850, and may be used for the present invention in its free form or in a pharmaceutically acceptable salt form or in both, on the same molar basis. The salt of 3-SI is typically the alkali metal salt such as the sodium or potassium salt, being water-soluble.

Referring now to the above Formula I, the lower alkyl is methyl, ethyl, propyl and the like. A partial listing of the pyrimidine derivatives of general Formula I includes, for example, 3-(2-methyl-4-aminopyrimidin-5-ylmethyl)-4,5-dimethylthiazolium salt (i.e. dimethialium);
3-(2-ethyl-4-aminopyrimidin-5-ylmethyl)-4,5-dimethylthiazolium salt;
3-(2-ethyl-4-aminopyrimidin-5-ylmethyl)-5-ethylthiazolium salt;
3-(2-methyl-4-aminopyrimidin-5-ylmethyl)-2,4-dimethylthiazolium salt;
1-(2-n-propyl-4-aminopyrimidin-5-ylmethyl)-2-methylpyridium salt (i.e. amprolium), etc.

The salts of the above pyrimidine derivatives include, as examples, the nitrate, hydrochloride, hydrobromide, thiocyanate and the like, which may respectively be either the mono- or di-salt.

Sulfa drugs are generally used as aqueous solutions, but they are so unpalatable to animals that, if given to them ad libitum, no sufficient intake can be expected. In connection with this respect, 3-SI is quite palatable to animals and, moreover, even a continued administration of this compound yields no adverse effect upon growth of the livestock and poultry.

As an example, White Leghorn chicks, 3 days of age, were battery-raised on a commercial feed for chicks and, meanwhile, the following test drugs were administered by way of drinking water to the chicks for a period of two weeks. This subacute toxicity test gave the following results.

| Test drug | Concentration of drug (percent) | Number of birds | Livability (percent) | Live weight (g.) | With live weight of control as 100 | Feed requirement [1] |
|---|---|---|---|---|---|---|
| 3-SI.Na | 0.2 | 30 | 100.0 | 165.0 | (97.5) | 1.93 |
| Sulfadimethoxine.Na | 0.2 | 30 | 80.0 | 110.4 | (65.2) | 2.10 |
| Sulfamonomethoxine.Na | 0.2 | 30 | 96.7 | 134.5 | (79.4) | 1.99 |
| Sulfaquinoxaline.Na | 0.2 | 30 | 93.3 | 92.9 | (54.9) | 2.93 |
| Control | | 30 | 100.0 | 169.3 | (100.0) | 1.93 |

[1] Feed requirement (feed/gain) = $\dfrac{\text{Feed intake (g.)}}{\text{Increase in body weight (g.)}}$ The safety of 3-SI is also demonstrated by the following test example using swine. Two groups of five young swine per group were raised for 60 days, Group A being fed normal feed and Group B being fed the normal feed in admixture with 0.5 g./kg.-feed of 3-SI, to give the following results showing no statistically significant difference between Groups A and B. The feed requirement was calculated according to the above-mentioned equation.

| Stage | Group | Mean body weight (kg.) | Feed intake kg./head | Body weight index | Feed requirement [1] |
|---|---|---|---|---|---|
| Initial | A | 19.62±4.53 | | 100 | |
| | B | 19.60±2.20 | | 100 | |
| 1 week | A | 22.56±5.57 | 7.14 | 115.0 | 2.43 |
| | B | 22.36±2.25 | | 114.1 | 2.59 |
| 2 weeks | A | 25.28±5.74 | 7.86 | 128.8 | 2.89 |
| | B | 24.94±2.85 | | 126.4 | 3.05 |
| 3 weeks | A | 27.88±6.38 | 9.06 | 142.1 | 3.49 |
| | B | 28.72±3.00 | | 146.5 | 2.40 |
| 4 weeks | A | 31.24±7.24 | 8.52 | 159.2 | 2.54 |
| | B | 31.98±3.10 | | 163.2 | 2.61 |
| 5 weeks | A | 35.72±7.90 | 11.92 | 182.1 | 2.66 |
| | B | 36.20±3.58 | | 184.7 | 2.82 |
| 6 weeks | A | 39.48±8.16 | 11.04 | 203.4 | 2.68 |
| | B | 40.44±3.64 | | 206.3 | 2.60 |
| Final (60 days) | A | 44.12±9.43 | 14.96 | 224.9 | 3.50 |
| | B | 44.68±3.58 | | 228.0 | 3.53 |

[1] See footnote 1 in preceding table.

The mixture of 3-SI and said pyrimidine derivative of general Formula I is also palatable and non-toxic to poultry. Therefore, it can also be easily administered as a solution in drinking water to obtain an adequate control effect.

Sulfa drugs themselves are insoluble or hardly soluble in water and; therefore, have been used as water-soluble salts such as the salts of alkali metals, e.g. sodium and potassium. It follows however, that the resulting aqueous solutions are stable only on the alkaline side and their solubilities decrease drastically on the acid side. In contrast, the pyrimidine derivatives of general Formula I are stable on the acid side and will either precipitate or decompose on the alkaline side. It is for this reason that it has heretofore been considered difficult to secure a stable aqueous solution containing both a sulfa drug and a pyrimidine derivative.

However, 3-SI is soluble in water even on the acid side and its stability is not affected by the concomitant presence of pyrimidine derivatives. Thus, the mixed drug composed of 3-SI and pyrimidine derivative according to this invention is also excellent in view of stability.

The solubility of 3-SI, in comparison with that of the conventional sulfa drugs, is shown below. The values of sulfisomezole, sulfadimethoxime and 3-SI in water at various pH levels are shown. It will be seen that 3-SI is soluble in excess of 0.2 percent over a wide pH range.

| pH | Solubilities in water, percent | | |
|---|---|---|---|
| | Sulfisomezole | Sulfadimethoxine | 3-SI |
| 2.8 | 0.05 | Insoluble | 0.25 |
| 3.8 | 0.04 | do | 0.29 |
| 5.5 | 0.09 | >0.05 | 1.54 |
| 6.5 | 0.32 | >0.01 | 6.57 |

The above results show that 3-SI is far more readily soluble even in comparison with sulfisomezole which, in structure, bears close resemblance to 3-SI.

The anti-protozoal drug of this invention can be administered, depending on the species of animal, symptoms, the age of the animal, etc., in varied forms such as the age of the animal, etc., in varied forms such as powder, granule, tablet, capsule, oil solution, aqueous solution, emulsion, suspension or whatever is suitable, either with or without the use of a solid or liquid diluent. Or, the drug may be administered as a feed additive, which may be either directly dispersed in the feed, drinking water and the like, or may be previously dispersed in a diluent and the resulting dispersion be incorporated in the feed, drinking water and the like.

The diluent mentioned above may be of any kind, insofar as it does not spoil or reduce the anti-protozoal activity of 3-SI or the anti-coccidial activity of the pyrimidine derivative of general Formula I, although said diluent is preferably one which can be used as a feed or a feed additive. For example, use may be made of such diluents as barley flour, wheat flour, rye flour, corn meal, soybean meal, soybean cake, rape-seed meal, rice hull, rice-bran, solvent-extracted rice-bran, sweet potato powder, white potato powder, bean-curd refuse, various types of starch, lactose, sucrose, glucose, fructose, yeast, waste yeast, fish meal, fermentation broth residue and the like. If desired, it is permissible to employ such supplements as various vitamins (e.g. vitamin $B_2$, fat-soluble vitamins, etc.), minerals (e.g. calcium sources), amino acids, proteins, carbohydrates, fats, etc., as well as preservatives, germicides, enzyme preparations, enterostomachics, antipyretics sedatives, antiphlogistics, purgatives and the like.

The proportions of 3-SI in the anti-protozoal drug of this invention should vary with different species of animals, routes of administration, purposes (prophylactic or therapeutic), symptoms in the host, etc., but generally fall within the range of about 0.0005 to 0.3 percent, desirably about 0.002 to 0.2 percent, relative to the feedstuff fed to the animals. Where the drug is incorporated in a feedstuff for controlling coccidiosis in poultry, the preferred concentrations are about 0.0005 to 0.3 percent (desirably about 0.002 to 0.2 percent) for 3-SI and about 0.001 to 0.05 percent (desirably about 0.002 to 0.025 percent) for the pyrimidine derivative (I), relative to the feedstuff. When the present drug is used as a feed supplement, it may be directly added to the feed, but for most practical purposes, it is preliminarily made into a premix containing about 1 to 30 percent of the 3-SI or further containing about 1 to 30 percent of the pyrimidine derivative (I) and, then, the premix be further diluted with the feed or drinking water.

The results of tests with the anti-protozoal drug of this invention are shown below. In the following the terms are used in accordance with the definitions given immediately below:

Rate of weight gain: The average weight of birds at the end of the experiment is divided by the average weight thereof at the time when the test was started, and after 1 is substracted from the product, the difference is multiplied by 100.

Weight gain ratio: The percentage of the rate of weight gain for each test group relative to the rate of weight gain for a normal control group, i.e. the group of uninfected and untreated individuals.

Number of bloody droppings: The total number of bloody droppings secreted by birds in each group.

Pathological changes: The pathological changes were investigated in the caeca for *Eimeria tenella* and in the small intestines for other species, and classified by the following criteria:

—:Normal, no pathological change
+:Slight change
++:Moderate change
+++:Serious change
++++:Pathological change all-over, very serious Rate of sporulation: To the feces, 2% aqueous solution of potassium dichromate, the volume being 10 times as much as the contents, is added, and the contents are incubated at 28° C. for 3 days. The percentage of the sporulated oocysts to the all in the contents is calculated.

Oocyst output (OPG): The total number of oocysts occurring in one gram of caecal contents or feces.

The number of oocysts per bird: Each bird is dissected and all the oocysts occurring in the entire intestinal tract are counted.

Test 1

White Leghorn chicks, 12 days of age, were orally inoculated with 100 thousand sporulated oocysts of *Eimeria acervulina* and, at the same time, were fed with feeds which contained dimethialium, 3–SI, and sulfadimethoxine, respectively. The results are summarized in Table 1, which clearly shows that against the chronic coccidiosis caused by *E. acervulina*, 3–SI is far more effective than sulfadimethoxine and dimethialium.

Test 2

White Leghorn hens, 200 days of age, were individually caged and continuously supplied with drinking water containing 0.2% of sulfadimethoxine sodium or 3–SI sodium. The results are summarized in Table 2, which indicates that, as contrasted to sulfadimethoxine, the administration of 3–SI causes no change in drinking water intake and results in a longer pre-molting period as compared to the control group (untreated group).

Test 3

(a) Of ten White Leghorn chicks, 10 days of age, five birds were orally inoculated with 25 thousand sporulated oocyats of *Eimeria tenella* each. The remaining five chicks were inoculated with 100 thousand sporulated oocysts of *Eimeria acervulina* each.

At the same time, the birds were fed with feeds containing dimethialium mononitrate and/or 3–SI. The results are summarized in Table 3–(a), from which it will be seen that the combined administration of dimethialium and 3–SI provides better prophylaxis than the use of either one or the other of the same compounds.

(b) In the same manner as in the above (a), five White Leghorn chicks per group of 11 days old were inoculated with 100 thousand sporulated oocysts of *Eimeria acervulina* each, and were fed with feeds containing 3-(2-ethyl-4-aminopyrimidin-5-ylmethyl) - 4,5 - dimethyl-thiazolium mononitrate (may be referred to as "DC–45") or both of DC–45 and 3–SI. The results are summarized in Table 3–(b).

Test 4

White Leghorn chicks, 10 days of age, were inoculated according to Table 4, using the sporulated oocysts of *Eimeria tenella, E. necatrix, E. acervulina* and *E. maxima*. At the same time, the chicks were fed with feeds containing dimethialium mononitrate and/or 3–SI. The results are summarized in Table 4.

Test 5

Mice (dd-strain) was intraperitoneally infected with *Toxoplasma gongii* (RH-strain) to obtain inoculum. The intraperitoneal fluid of the infected mice was inoculated in an amount containing 12 thousand parasites each to nine sensitive mice (dd-strain) intraperitoneally. The mice were fed with normal feed except that 0.12 percent by weight of 3–SI relative to the feed was administered in admixture with the feed to the test group, consisting of four mice among the nine, for the initial 5 days.

While the five mice of the control group survived only for an average of 7.4 days (7, 7, 7, 8 and 8 days, respectively) after the inoculation, the mice of the test group survived for an average of 12.5 days (12, 12, 13 and 13 days, respectively) after the inoculation.

TABLE 1

| Drug and concentration | Infection | Oocyst output 4th day | 5th day | 6th day | 7th day | Pathological change in the small intestine (number of birds) +++ | ++ | + | — | Weight-gain ratio (percent) |
|---|---|---|---|---|---|---|---|---|---|---|
| Uninfected, untreated group | — | 0 | 0 | 0 | 0 | | | | 5 | 100 |
| Infected, untreated group | + | 12,600 | 457,100 | 72,300 | 36,100 | 3 | 2 | | | 69 |
| Dimethialium 0.006% | + | 300 | 284,800 | 102,200 | 14,200 | 2 | 2 | 1 | | 102 |
| Sulfadimethoxine 0.05% | + | 100 | 356,100 | 102,400 | 1,023,400 | 1 | 3 | 1 | | 92 |
| 3–SI 0.05% | + | 0 | 200 | 9,200 | 19,400 | | 3 | 2 | | 95 |
| 3–SI 0.025% | + | 0 | 500 | 71,800 | 5,320 | 2 | 2 | 1 | | 73 |

TABLE 2

| Drug in drinking water (25 birds per group) | Water intake (average per bird, control as 100) 1st day | 2 | 3 | 4 | 5 | 6 | 7 | 8 | 9 | 10 | The days after administration start till molting | Egg production rate Administration start | 6th day of administration |
|---|---|---|---|---|---|---|---|---|---|---|---|---|---|
| Control untreated | 100 | 100 | 100 | 100 | 100 | 100 | 100 | 100 | 100 | 100 | | 60.7 | 63.0 |
| Sulfadimethoxine·Na | 71.8 | 43.9 | 39.0 | 44.8 | 75.8 | 43.4 | 50.6 | 33.0 | 41.4 | 38.0 | 7 days | 62.0 | 10.0 |
| 3–SI·Na | 126.8 | 130.8 | 108.0 | 120.9 | 116.4 | 114.1 | 103.8 | 107.8 | 98.8 | 123.4 | 14 days | 61.0 | 57.0 |

TABLE 3-(a)

| Drug in feed (percent) | | Infection | No. of birds | Number of bloody droppings | | | | Pathological change in the intestine | | | | | Number of oocysts per bird (×10⁴) | |
|---|---|---|---|---|---|---|---|---|---|---|---|---|---|---|
| Dimethialium | 3-SI | | | 4th | 5th | 6th | 7th | ++++ | +++ | ++ | + | − | | |
| E. tenella | 0.006 | | + | 5 | | | | | | | | | 5 | 0 | 10-day chicks; 25 thousand oocysts per bird; autopsied on 8th day. |
| | 0.006 | 0.005 | + | 5 | | | | | | | | | 5 | 0 | |
| | 0.003 | | + | 5 | | | 2 | | | | 1 | 3 | 1 | 2.3 | |
| | 0.003 | 0.005 | + | 5 | | | 3 | | | | 1 | 3 | 1 | 1.9 | |
| | | 0.005 | + | 5 | 8 | 40 | 45 | 3 | 5 | | | | | 240.0 | |
| | | | + | 5 | 9 | 45 | 45 | 2 | 5 | | | | | 211.0 | |
| E. acervulina | 0.006 | | + | 5 | | | | | | | | | 5 | 1,571.0 | 10-day chicks; 100 thousand oocysts per bird; autopsied on 6th day. |
| | 0.006 | 0.005 | + | 5 | | | | | | | | | 5 | 0 | |
| | 0.003 | | + | 5 | | | | | | | | | 5 | 1,920.0 | |
| | 0.003 | 0.005 | + | 5 | | | | | | | | | 5 | 0 | |
| | | 0.005 | + | 5 | | | | | | | | | 5 | 0 | |
| | | | + | 5 | | | | | 5 | | | | | 2,310.0 | |
| | | | − | 5 | | | | | | | | | 5 | | Healthy control. |

TABLE 3-(b)

| Drug in feed (percent) | | Infection | Pathological change in the intestine | | | Oocyst output | | | Rate of sporulation (percent) | Weight gain ratio |
|---|---|---|---|---|---|---|---|---|---|---|
| DC-45 | 3-SI | | ++ | + | − | 4th day | 5th day | 6th day | | |
| 0.003 | 0 | + | 4 | 1 | | $10^{6.5}$ | $10^{6.8}$ | $10^{6.9}$ | 79 | 97.6 |
| 0.003 | 0.003 | + | | | 5 | 0 | 0 | 0 | 0 | 93.4 |
| 0.003 | 0.0015 | + | | | 5 | 0 | 0 | 0 | 0 | 101.3 |
| 0.003 | 0.00075 | + | | | 5 | 0 | 0 | 0 | 0 | 100.8 |
| None | None | + | 5 | | | $10^{6.7}$ | $10^{7.2}$ | $10^{7.0}$ | 96 | 95.5 |
| None | None | − | | | 5 | 0 | 0 | 0 | 0 | 100 |

TABLE 4

[The combined effect (prophylactic) of dimethialium and the sulfa drug against mixed coccidial infections]

| Coccidia (Number of oocysts 10⁴/bird) | | | | Drugs (percent in feed) | | Number of birds | | Rate of weight gain, percent | Oocyst output (×10⁴) | | | |
|---|---|---|---|---|---|---|---|---|---|---|---|---|
| E. tenella | E. necatrix | E. acervulina | E. maxima | Dimethialium mononitrate | 3-SI | Tested | Dead | | 5th day | 6th day | 7th day | 8th day |
| 2.0 | | 20.0 | | 0.006 | | 10 | 1 | 89.6 | 4.0 | 121.0 | 205.0 | 90.0 |
| 2.0 | | 20.0 | | | 0.005 | 10 | 2 | 62.6 | 0 | 0 | 0.2 | 15.0 |
| 2.0 | | 20.0 | | 0.006 | 0.005 | 10 | 0 | 100.0 | 0 | 0 | 0 | 0 |
| 2.0 | | 20.0 | | | | 10 | 7 | 59.3 | 8.0 | 250.0 | 171.0 | 521.0 |
| | 1.0 | 20.0 | | 0.006 | | 10 | 3 | 87.9 | 9.1 | 309.1 | 799.0 | 195.1 |
| | 1.0 | 20.0 | | | 0.005 | 10 | 4 | 68.3 | 0 | 0 | 0 | 2.1 |
| | 1.0 | 20.0 | | 0.006 | 0.005 | 10 | 0 | 98.9 | 0 | 0 | 0 | 0 |
| | 1.0 | 20.0 | | | | 10 | 9 | 52.5 | 12.0 | 311.3 | 982.2 | 291.1 |
| 2.0 | 1.0 | 20.0 | 20.0 | 0.006 | | 10 | 3 | 88.9 | 27.3 | 1,920.0 | 3,010.5 | 613.0 |
| 2.0 | 1.0 | 20.0 | 20.0 | | 0.005 | 10 | 3 | 64.1 | 0 | 0 | 3.0 | 81.5 |
| 2.0 | 1.0 | 20.0 | 20.0 | 0.006 | 0.005 | 10 | 0 | 101.0 | 0 | 0 | 0 | 0 |
| 2.0 | 1.0 | 20.0 | 20.0 | | | 10 | 9 | 58.4 | 28.0 | 1,711.0 | 2,190.2 | 711.0 |
| | | | | 0.006 | | 10 | 0 | 100.5 | | | | |
| | | | | | 0.005 | 10 | 0 | 102.2 | | | | |
| | | | | | | 10 | 0 | 100.0 | | | | |

The present invention is further explained by way of examples which are not to be construed as limitative but are solely for the purpose of illustration. In the examples, parts by weight bear the same relationship to parts by volume as do grams to milliliters. Throughout the specification thea bbreviations "g." and "kg." means "grams(s)" and "kilogram(s)," respectively.

EXAMPLE 1

The following components are admixed.

|  | Parts by wt. |
|---|---|
| 3-SI | 10 |
| Wheat flour | 90 |

0.1 part by weight of the mixture is homogeneously added to 99.9 parts by weight of conventional diet for chicks. Thus-prepared composition is fed to chicks.

EXAMPLE 2

The following components are admixed.

|  | Parts by wt. |
|---|---|
| 3-SI | 25 |
| Soybean flour | 75 |

0.4 part by weight of the mixture is homogeneously added to 99.6 parts by weight of conventional diet for swine. Thus-prepared composition is fed to swine.

EXAMPLE 3

The following components are homogeneously admixed.

|  | Parts by wt. |
|---|---|
| 3-SI sodium | 10 |
| Lactose | 85 |
| Sucrose | 5 |

One part by weight of the mixture is dissolved in 1,000 parts by volume of drinking water. Thus-prepared drinking water is given to layers.

EXAMPLE 4

The following components are admixed.

|  | Parts by wt. |
|---|---|
| 3-SI | 10 |
| Dimethialium mononitrate | 10 |
| Fermentation residue | 80 |

0.05 part by weight of the mixture is homogeneously added to 99.95 parts by weight of conventional diet for breeders. Thus-prepared composition is fed to breeders.

EXAMPLE 5

The following components are admixed.

|  | Parts by wt. |
|---|---|
| 3-SI | 2 |
| 3 - (2 - ethyl - 4-aminopyrimidin-5-ylmethyl)-4,5-dimethylthiazolium mononitrate | 3 |
| Corn meal | 95 |

0.1 part by weight of the mixture is homogeneously added to 99.9 parts by weight of conventional diet for chicks.

Thus-prepared composition is fed to chicks.

EXAMPLE 6

The following components are admixed together to prepare a premix composition.

| | Parts by wt. |
|---|---|
| 3-SI sodium | 10 |
| Lactose | 85 |
| Sucrose | 5 |

On the other hand, the following components are admixed.

| | Parts by wt. |
|---|---|
| Dimethialium chloride hydrochloride | 10 |
| Lactose | 85 |
| Sucrose | 5 |

0.5 part by weight each of both premix compositions is mixed together. Thus-prepared mixture is dissolved in 1,000 parts by volume of drinking water, and is given to chicks.

What is claimed is:

1. Method for the prevention or treatment of toxoplasmosis or coccidiosis, which comprises administering orally to domestic animals and antitoxoplasmal or anticoccidial amount of a member selected from the group consisting of 3-sulfanilamidoisoxazole, its pharmaceutically acceptable salt and a mixture thereof.

2. The method according to claim 1, wherein the antitoxoplasmal or anticoccidial amount is from about 0.0005 to 0.3 percent by weight in terms of 3-sulfanilamidiosoxazole relative to the feedstuff fed to the animals.

3. The method according to claim 1, wherein the antitoxoplasmal or anti-coccidial ingredient is administered in admixture with the feedstuff.

4. The method according to claim 1, wherein the antitoxoplasmal or anti-coccidial ingredient is administered together with drinking water.

5. The method according to claim 1, for treating coccidiosis in poultry.

6. The method according to claim 5, wherein the poultry is administered the 3-sulfanilamidoisoxazole with an anti-coccidial amount of a member selected from the group consisting of pharmaceutically acceptable salts of pyrimidine derivatives of the formula:

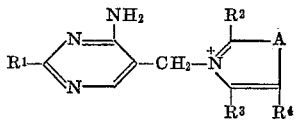

wherein A is —S— or —CH=CH—, R¹ is lower alkyl of at most 3 carbon atoms and each of R², R³ and R⁴ is H or lower alkyl of at most 3 carbon atoms, and a mixture thereof.

7. The method according to claim 6, wherein the anticoccidial amount is from about 0.001 to 0.05 percent by weight in terms of the pyrimidine derivative base relative to the feedstuff fed to the poultry.

8. The method according to claim 6, wherein the pyrimidine derivative salt is 3-(2-methyl-4-aminopyrimidin-5-ylmethyl)-4,5-dimethylthiazolium salt.

9. The method according to claim 6, wherein the pyrimidine derivative salt is 3-(2-ethyl-4-aminopyrimidin-5-ylmethyl)-4,5-dimethylthiazolium salt.

10. The method according to claim 6, wherein the pyrimidine derivative salt is 1-(2-n-propyl-4-aminopyrimidin-5-ylmethyl)-2-methylpyridinium salt.

11. A composition which comprises: (a) 3-sulfanilamidoisoxazole, (b) a member selected from the group consisting of pharmaceutically acceptable salts of pyrimidine derivatives of the formula:

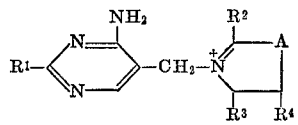

wherein A is —S— or —CH=CH—, R¹ is lower alkyl of at most 3 carbon atoms and each of R², R³ and R⁴ is H or lower alkyl of at most 3 carbon atoms, and a mixture thereof and (c) a major proportion of physiologically acceptable carrier for the ingredients (a) and (b) and wherein ingredients (a) and (b) are present in an antitoxoplasmally or anticoccidially effective amount.

12. The composition according to claim 11, wherein the amount of the ingredient (a) is from about 0.0005 to about 0.3 percent by weight in terms of 3-sulfanilamido isoxazole and the amount of the ingredient (b) is from about 0.001 to about 0.05 percent by weight in terms of the pyrimidine derivative base, relative to the composition.

13. The composition according to claim 11, wherein the ingredient (b) is 3-(2-methyl-4-aminopyrimidin-5-ylmethyl)-4,5-dimethylthiazolium salt.

14. The composition according to claim 11, wherein the ingredient (b) is 3-(ethyl-4-aminopyrimidin-5-ylmethyl)-4,5-dimethylthiazolium salt.

15. The composition according to claim 11, wherein the ingredient (b) is 1-(2-n-propyl-4-aminopyrimidin-5-ylmethyl)-2-methylpyridinium salt.

16. A premix composition comprising about 1 to about 30 percent by weight in terms of 3-sulfanilamidoisoxazole and from about 1 to about 30 percent by weight in terms of pharmaceutically acceptable salts of pyrimidine derivatives of the formula

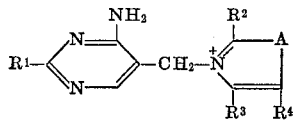

wherein A is —S— or CH=CH—, R¹ is lower alkyl of at most 3 carbon atoms and each of R², R³ and R⁴ is H or lower alkyl of at most 3 carbon atoms, the balance being premix carrier.

References Cited

UNITED STATES PATENTS

| 3,085,937 | 4/1963 | Hirayama | 424—229 |
| 3,483,292 | 12/1969 | Ishii | 424—251 |

FOREIGN PATENTS 1,011,850 12/1965 Great Britain.

SAM ROSEN, Primary Examiner

U.S. Cl. X.R.

424—251